(12) United States Patent
Grago

(10) Patent No.: US 10,895,308 B1
(45) Date of Patent: Jan. 19, 2021

(54) INTERNAL MOTION SYSTEM

(71) Applicant: John Grago, Winter Springs, FL (US)

(72) Inventor: John Grago, Winter Springs, FL (US)

(*) Notice: Subject to any disclaimer, the term of this patent is extended or adjusted under 35 U.S.C. 154(b) by 40 days.

(21) Appl. No.: 16/205,661

(22) Filed: Nov. 30, 2018

(51) Int. Cl.
*F16H 25/08* (2006.01)
*F16H 25/14* (2006.01)

(52) U.S. Cl.
CPC .................... *F16H 25/14* (2013.01)

(58) Field of Classification Search
CPC .......... F16H 21/36; F16H 25/04; F16H 25/06; F16H 25/14
See application file for complete search history.

(56) References Cited

U.S. PATENT DOCUMENTS

2013/0014602 A1* 1/2013 Villalobos ............... F16H 21/36
74/52

* cited by examiner

*Primary Examiner* — Adam D Rogers
(74) *Attorney, Agent, or Firm* — Allen, Dyer, Doppelt + Gilchrist, PA

(57) ABSTRACT

First and second plates have first and second elliptical apertures respectively. First and second carriage assemblies are adjacent to the first and second elliptical apertures. The first and second carriage assemblies have a common axis of rotation. First and second rails are within the first and second carriage assemblies respectively. Two first weights and two second weights are slidable along the first and second rails respectively. A first spring urges the two first weights outwardly into contact with the first elliptical aperture. A second spring urges the two second weights outwardly into contact with the second elliptical aperture. A differential mounted between the first and second plates has a first shaft rotating the first carriage assembly and first weights in a first direction. The differential has a second shaft rotating the second carriage assembly and second weights in a second direction opposite the first direction.

4 Claims, 4 Drawing Sheets

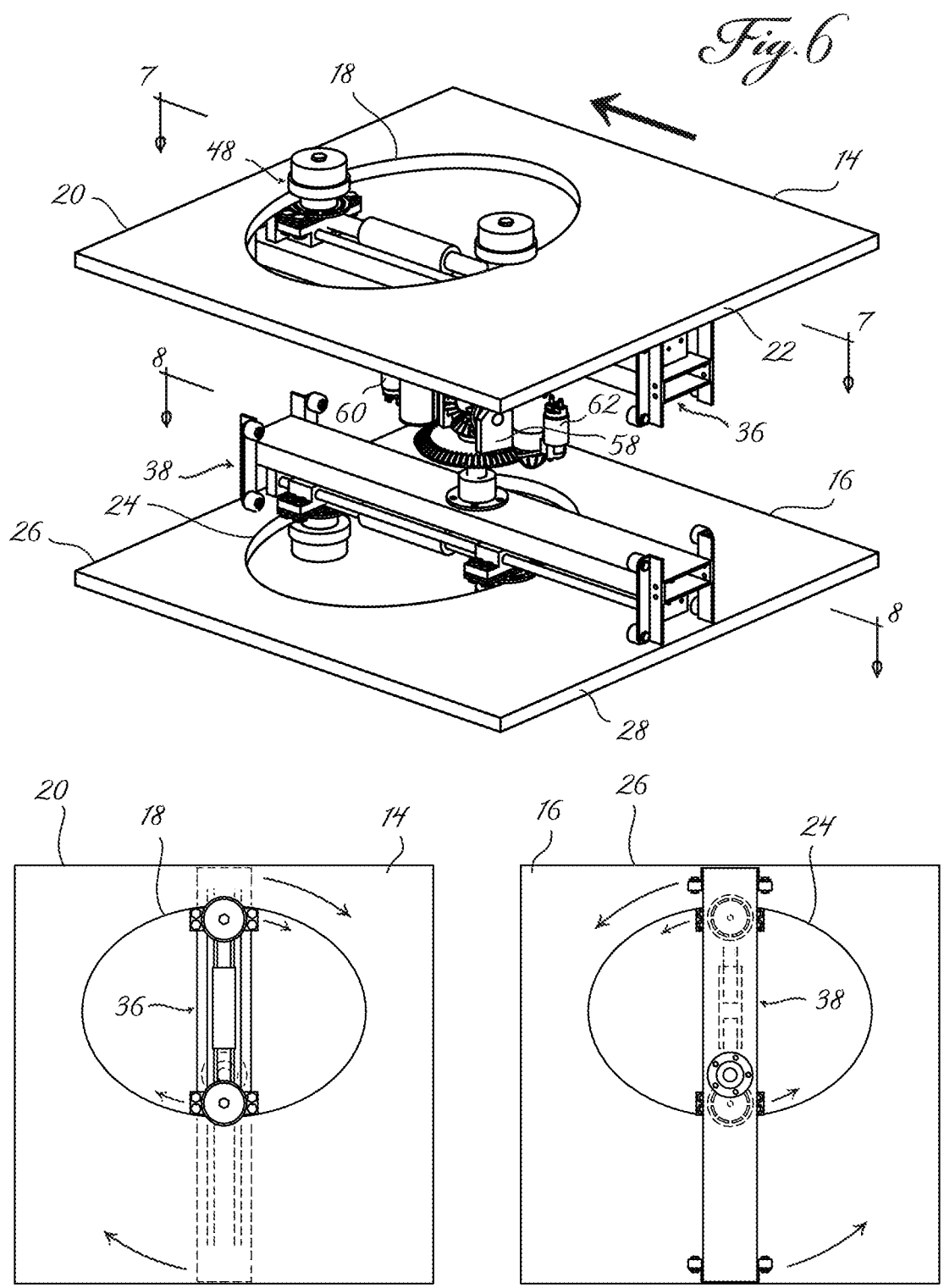

INTERNAL MOTION SYSTEM

BACKGROUND OF THE INVENTION

Field of the Invention

The present invention relates to an internal motion system and more particularly pertains to rotating weights within the system for linearly moving the system in response to the rotating of the weights. The rotating and the linearly moving are done in a safe, convenient, and economical manner.

Description of the Prior Art

The use of other motion systems is known in the prior art. More specifically, other motion systems previously devised and utilized for the purpose of linearly moving the system are known to consist basically of familiar, expected, and obvious structural configurations, notwithstanding the myriad of designs encompassed by the crowded prior art which has been developed for the fulfillment of countless objectives and requirements.

While known systems and devices fulfill their respective, particular objectives and requirements, they do not describe an internal motion system that allows for linearly moving the system in response to rotating weights within the system.

In this respect, the internal motion system according to the present invention substantially departs from the conventional concepts and designs of the prior art, and in doing so provides an apparatus primarily developed for the purpose of rotating weights within the system for linearly moving the system in response to the rotating of the weights.

Therefore, it can be appreciated that there exists a continuing need for a new and improved internal motion system which can be used for linearly moving the system in response to rotating weights within the system. In this regard, the present invention substantially fulfills this need.

SUMMARY OF THE INVENTION

In view of the disadvantages inherent in the known types of motion systems of known designs and configurations now present in the prior art, the present invention provides an improved internal motion system. As such, the general purpose of the present invention, which will be described subsequently in greater detail, is to provide a new and improved internal motion system and method which has all the advantages of the prior art and none of the disadvantages.

To attain this, from a broad perspective, first provided are first and second plates with first and second elliptical apertures respectively. First and second carriage assemblies are adjacent to the first and second elliptical apertures. The first and second carriage assemblies have a common axis of rotation. First and second rails are within the first and second carriage assemblies respectively. Two first weights are slidable along the first rails. Two second weights are slidable along the second rails. The two first weights are urged outwardly by a first spring into contact with the first elliptical aperture. The two second weights are urged outwardly by a second spring into contact with the second elliptical aperture. A differential housing is mounted between the first and second plates. The differential has a first shaft rotating the first carriage assembly and first weights in a first direction. The differential has a second shaft rotating the second carriage assembly and second weights in a second direction opposite the first direction.

There has thus been outlined, rather broadly, the more important features of the invention in order that the detailed description thereof that follows may be better understood and in order that the present contribution to the art may be appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved internal motion system which has all the advantages of the prior motion systems of known designs and configurations and none of the disadvantages.

It is another object of the present invention to provide a new and improved internal motion system which may be easily and efficiently manufactured and marketed.

It is a further object of the present invention to provide a new and improved internal motion system which is of durable and reliable constructions.

An even further object of the present invention is to provide a new and improved internal motion system which is susceptible of a low cost of manufacture with regard to both materials and labor, and which accordingly is then susceptible of low prices of sale to the consuming public, thereby making such internal motion system economically available.

Lastly, it is an object of the present invention to provide an internal motion system for rotating weights within the system for linearly moving the system in response to the rotating of the weights. The rotating and the linearly moving are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a perspective illustration of the upper and lower plates with the upper and lower carriage assemblies.

FIG. 7A is a cross sectional view of the upper plate and upper carriage assembly taken along line 7-7 of FIG. 6.

FIG. 7B is a cross sectional view of the lower plate and lower carriage assembly taken along line 8-8 of FIG. 6.

The same reference numerals refer to the same parts throughout the various Figures.

DESCRIPTION OF THE PREFERRED EMBODIMENT

Figure 1:
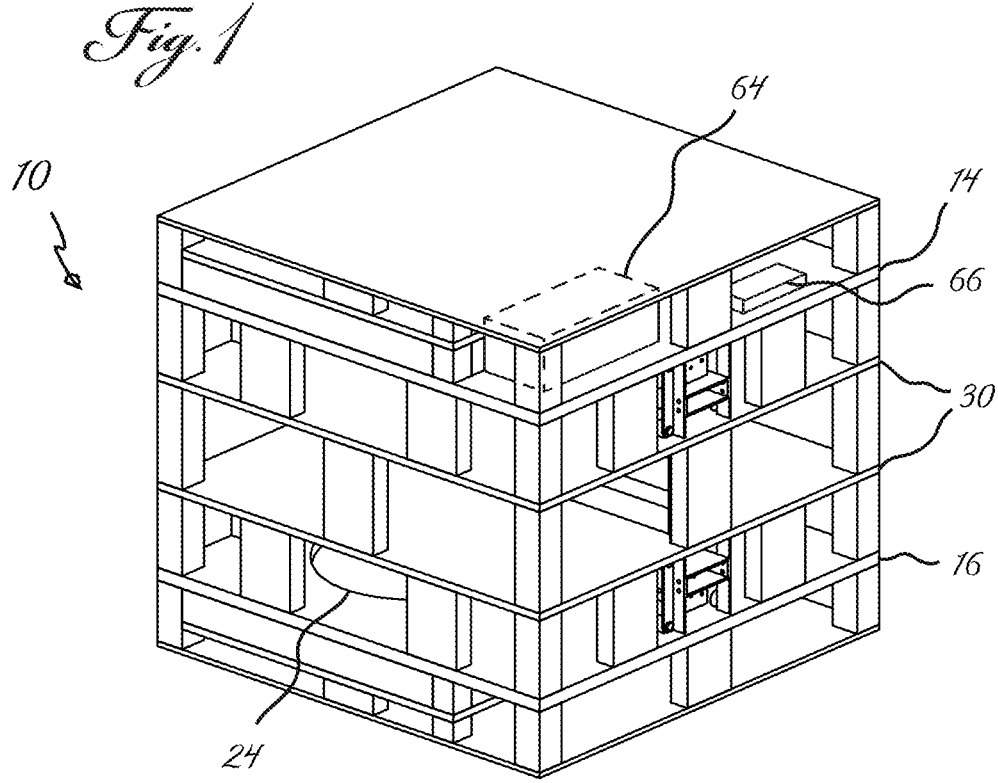
FIG. 1 is a perspective illustration of the internal motion system constructed in accordance with the principles of the present invention.
Figure 2:
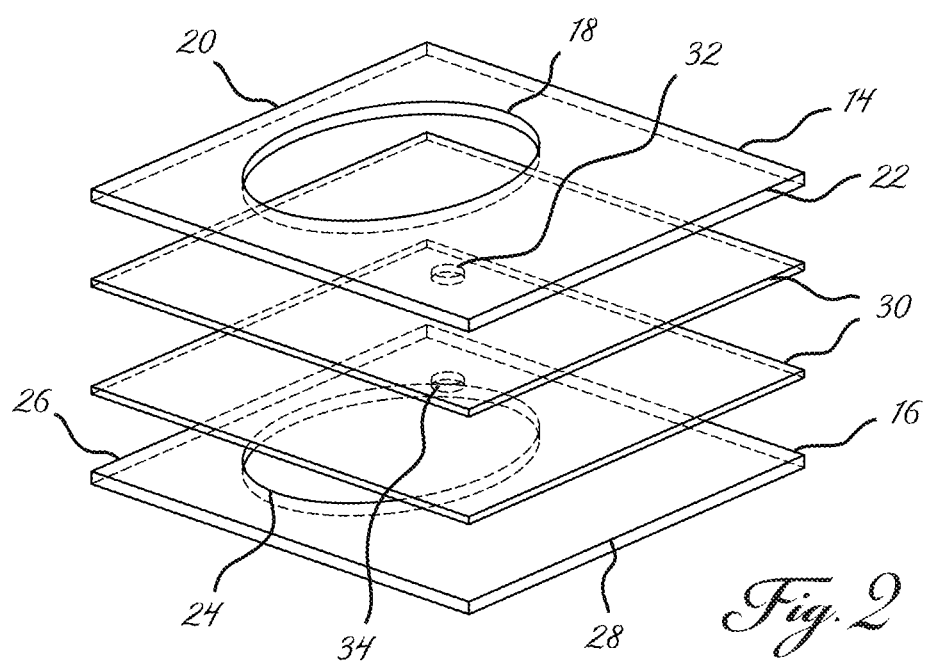
FIG. 2 is an exploded perspective illustration of the first and second plates with first and second elliptical apertures.
Figure 3:
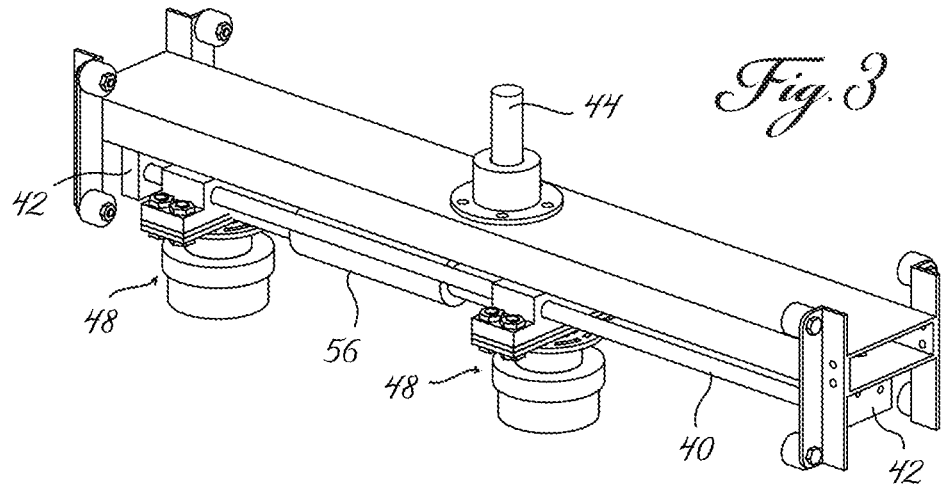
FIG. 3 is perspective illustration of a carriage assembly.

With reference now to the drawings, and in particular to FIG. 1 thereof, the preferred embodiment of the new and improved internal motion system embodying the principles and concepts of the present invention and generally designated by the reference numeral 10 will be described.

The present invention, the internal motion system is comprised of a plurality of components. In their broadest context such include upper and lower plates with elliptical apertures, intermediate plates, upper and lower carriage assemblies, a differential, and a motor. Such components are individually configured and correlated with respect to each other so as to attain the desired objective.

In the preferred embodiment of the internal motion system, designated by reference numeral 10, first provided are an upper plate 14 and a similarly configured lower plate 16. The upper plate and the lower plate are parallel and elevationally spaced. The upper plate has an upper aperture 18 in an elliptical configuration creating an upper elliptical periphery with an upper major axis and an upper minor axis. The upper plate has an upper forward end 20 and an upper rearward end 22. The lower plate has a lower aperture 24 in an elliptical configuration creating a lower elliptical periphery with a lower major axis and a lower minor axis. The lower plate has a lower forward end 26 and a lower rearward end 28.

Intermediate plates 30 are provided next. The intermediate plates are equally spaced between the upper plate and the lower plate. The intermediate plates are configured with an upper center opening 32 and a lower center opening 34 respectively located between the upper aperture and the lower aperture.

Provided next is an upper carriage assembly 36 and a lower carriage assembly 38. The upper carriage assembly is in operative proximity to the upper aperture and rotatable with respect thereto around an upper axis of rotation. The upper axis of rotation is located on the upper minor axis closer to the rearward end than to the forward end. The lower carriage assembly is in operative proximity to the lower aperture and rotatable with respect thereto around a lower axis of rotation. The lower axis of rotation is located on the lower minor axis closer to the rearward end than to the forward end. The upper carriage assembly and the lower carriage assembly have a common axis of rotation. Included in both the upper and lower carriage assemblies are a pair of parallel rails 40 with rail ends 42 and a drive shaft 44 with a gear 46.

Figure 4:
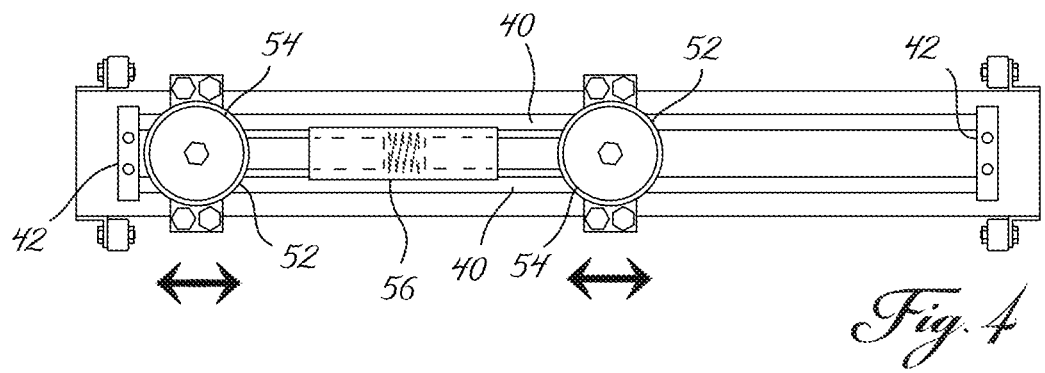
FIG. 4 is a bottom view of the carriage assembly shown in FIG. 3.
Figure 5:
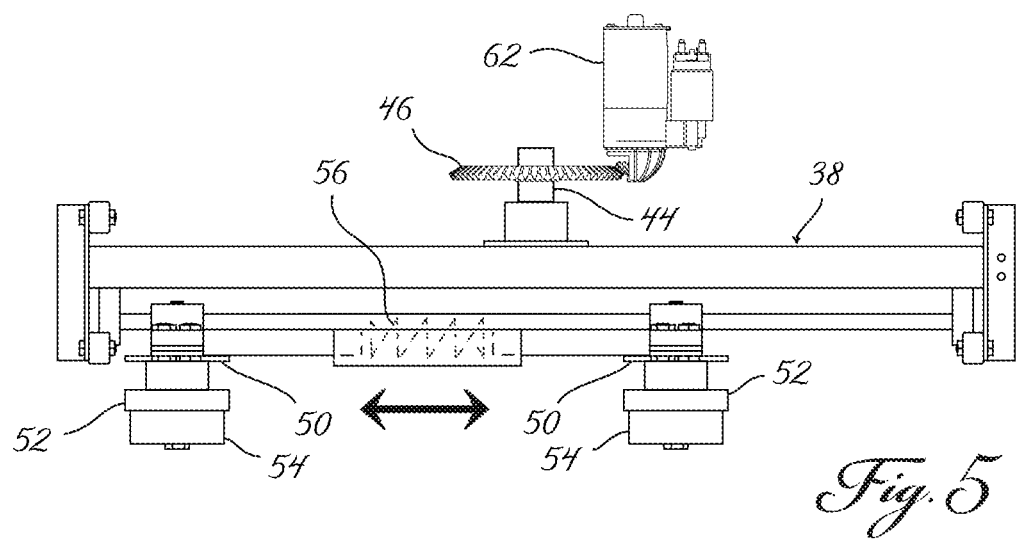
FIG. 5 is a side elevational view of the carriage assembly shown in FIGS. 3 and 4 with a gear and motor.
Figure 8A:
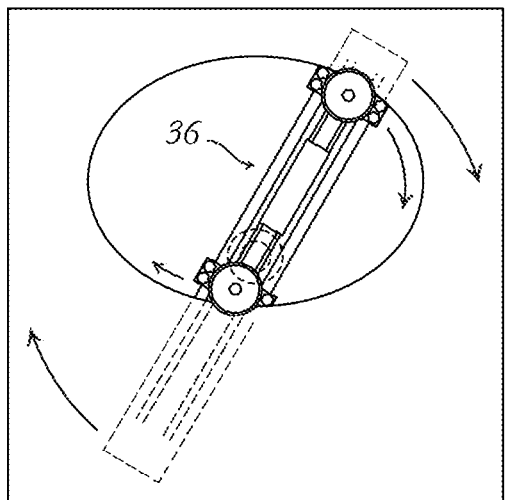
FIG. 8A is an alternate view of FIG. 7A showing the upper carriage assembly rotating in the first direction.
Figure 8B:
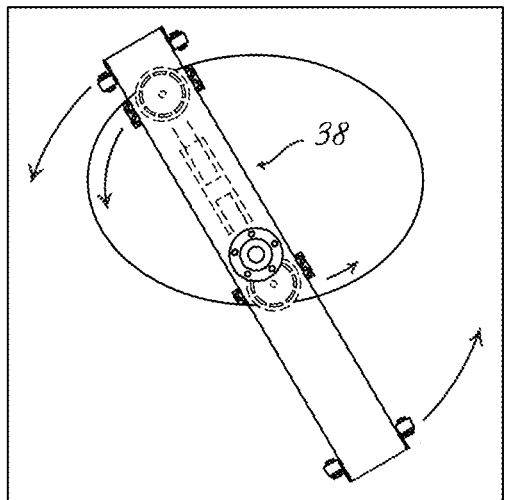
FIG. 8B is an alternate view of FIG. 7B showing the lower carriage assembly rotating in the second direction.
Figure 9A:
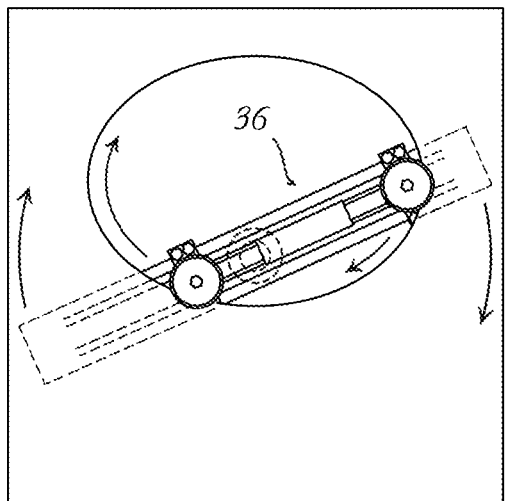
FIG. 9A is an alternate view of FIG. 8A showing the upper carriage assembly rotating to a further position in the first direction.
Figure 9B:
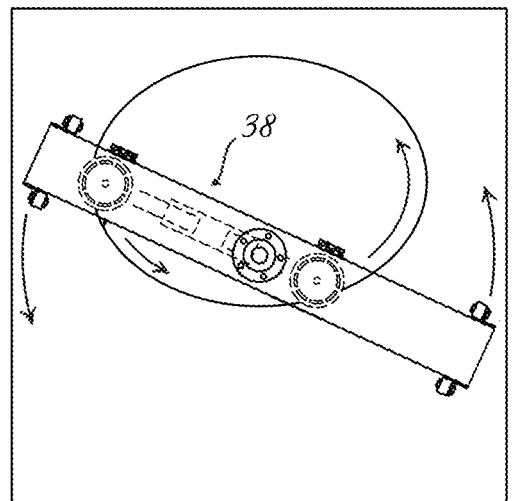
FIG. 9B is an alternate view of FIG. 8B showing the lower carriage assembly rotating to a further position in the second direction.
Figure 10A:
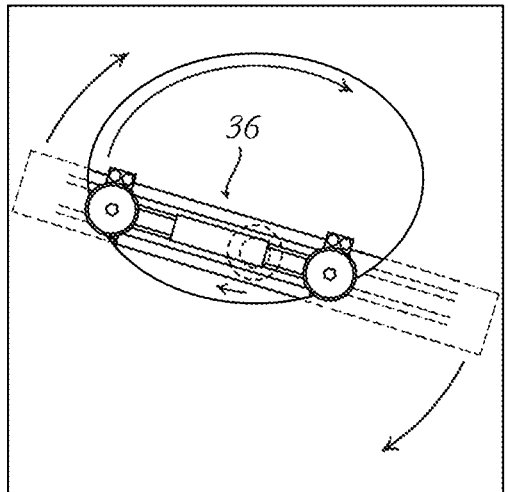
FIG. 10A is an alternate view of FIG. 9A showing the upper carriage assembly rotating to an even further position in the first direction.
Figure 10B:
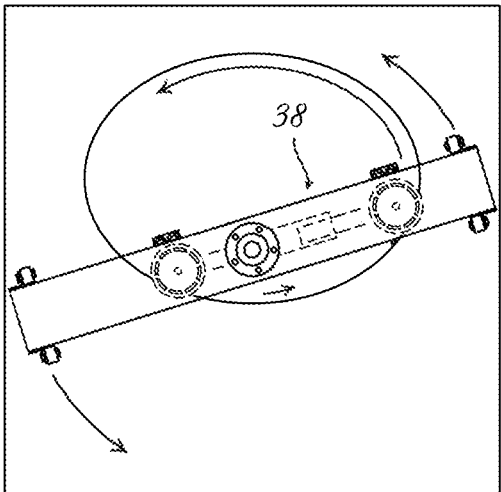
FIG. 10B is an alternate view of FIG. 9B showing the lower carriage assembly rotating to an even further position in the second direction.

Next, two rotatable pulley subassemblies 48 are provided on each pair of parallel rails. Referring to FIGS. 4 and 5, the pulley subassemblies are slidable along the parallel rails on opposite sides of the common central axis. Each pulley subassembly has a first disk 50, a second disk 52, and a weight 54. A spring 56 is positioned between the two rotatable pulley subassemblies of each carriage assembly. The spring urges each pulley subassembly outward into rotatable contact with the elliptical peripheries of the upper and lower apertures respectively.

Further provided is a differential housing 58 mounted between the intermediate plates. The differential housing receives the drive shaft and gear of the upper carriage assembly through the upper center opening to drive the upper carriage assembly in a first direction of rotation. The differential housing also receives the drive shaft and gear of the lower carriage assembly through the lower center opening to drive the lower carriage assembly in a second direction of rotation equal and opposite from the first direction of rotation. The first direction of rotation and second direction of rotation are best shown in FIGS. 7A and 7B.

Provided next are an upper motor 60 and a lower motor 62. The upper motor is operatively coupled to the gear and drive shaft of the upper carriage assembly. The lower motor is operatively coupled to the gear and drive shaft of the lower carriage assembly.

Lastly provided is a battery pack 64 with a controller 66. The battery pack and controller supply power and activate the upper motor and the lower motor.

Attention is now directed to FIGS. 8A-10B. During system rotation, the pulley subassemblies propelled along the parallel rails towards the forward ends of the minor axes have a higher speed and generate greater momentum than the pulley subassemblies moving towards the rearward ends of the minor axis. The greater momentum generated towards the forward ends propels the system in a linear forward direction.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An internal motion system comprising:
    a first plate having a first elliptical aperture and a second plate having a second elliptical aperture;
    a first carriage assembly adjacent to the first elliptical aperture and a second carriage assembly adjacent to the second elliptical aperture, the first and second carriage assemblies having a common axis of rotation;
    first rails within the first carriage assembly and second rails within the second carriage assembly, two first weights slidable along the first rails, two second weights slidable along the second rails, the two first weights being urged outwardly by a first spring into contact with the first elliptical aperture, the two second weights being urged outwardly by a second spring into contact with the second elliptical aperture; and
    a differential mounted between the first and second plates, the differential having a first shaft rotating the first carriage assembly and first weights in a first direction, the differential having a second shaft rotating the second carriage assembly and second weights in a second direction opposite the first direction.

2. The system as set forth in claim 1 and further including:
    at least one motor operably coupled to the differential for rotating the first and second carriage assemblies.

3. The system as set forth in claim 1 and further including:
    a source of power and a controller for supplying power and activating the motor.

4. An internal motion system for rotating weights within the system and for linearly moving the system in response to the rotating of the weights, the system comprising, in combination:
    an upper plate (14) and a lower plate (16), the upper plate and the lower plate being parallel and elevationally spaced, the upper plate having an upper aperture (18) in an elliptical configuration creating an upper elliptical periphery with an upper major axis and an upper minor axis and an upper forward end (20) and an upper rearward end (22), the lower plate having a lower aperture (24) in an elliptical configuration creating a lower elliptical periphery with a lower major axis and a lower minor axis and a lower forward end (26) and a lower rearward end (28);
    an upper intermediate plate and a lower intermediate plate, the intermediate plates being (30) equally spaced between the upper plate and the lower plate, the upper intermediate plate having an upper center opening (32), the lower intermediate plate having a lower center opening (34), the upper center opening and the lower center opening located between the upper aperture and the lower aperture;
    an upper carriage assembly (36) and a lower carriage assembly (36) having a common axis of rotation, the upper carriage assembly (36) being in operative proximity to the upper aperture and rotatable with respect thereto around an upper axis of rotation, the upper axis of rotation being located on the upper minor axis closer to the upper rearward end than to the upper forward end, the upper carriage assembly having an upper pair of parallel rails (40) with rail ends (42) and a drive shaft (44) with a gear (46), two upper rotatable pulley subassemblies (48) slidable along the upper pair of parallel rails on opposite sides of the common central axis, each upper pulley subassembly having a first disk (50), a second disk (52), and one of the weights (54);
    a lower carriage assembly (38) having a common axis of rotation with the upper carriage assembly, the lower carriage assembly being in operative proximity to the lower aperture and rotatable with respect thereto around a lower axis of rotation, the lower axis of rotation being located on the lower minor axis closer to the lower rearward end than to the lower forward end, the lower carriage assembly having a lower pair of parallel rails (40) with rail ends (42) and a drive shaft (44) with a gear (46), two lower rotatable pulley subassemblies (48) slidable along the lower pair of parallel rails on opposite sides of the common central axis, each lower pulley subassembly having a first disk (50), a second disk (52), and another of the weights (54);
    a first spring (56) positioned between the two upper rotatable pulley subassemblies of the upper carriage assembly, the first spring urging the two upper rotatable pulley subassemblies outwardly into rotatable contact with the elliptical periphery of the upper aperture;
    a second spring (56) positioned between the two lower rotatable pulley subassemblies of the second carriage assembly, the second spring urging the two lower rotatable pulley subassemblies outwardly into rotatable contact with the elliptical periphery of the lower aperture;
    a differential housing (58) mounted between the intermediate plates, the differential housing receiving the drive shaft and gear of the upper carriage assembly through the upper center opening driving the upper carriage assembly in a first direction of rotation, the differential housing also receiving the drive shaft and gear of the lower carriage assembly through the lower center opening driving the lower carriage assembly in a second direction of rotation equal and opposite from the first direction of rotation; and
    an upper motor (60) rotating the gear and drive shaft of the upper carriage assembly and a lower motor (62) rotating the gear and drive shaft of the lower carriage assembly, a battery pack (64) with a controller (66) powering the upper motor and the lower motor, the upper and lower pulley subassemblies being propelled along the upper and lower parallel rails toward the forward ends at a higher speed and generating greater momentum than the upper and lower pulley subassemblies moving toward the rearward ends to propel the system in a linear forward direction.

* * * * *